United States Patent [19]

Philipps et al.

[11] 3,753,245

[45] Aug. 14, 1973

[54] RECORD READING SYSTEM

[75] Inventors: Louis E. Philipps, Addison; Eugene A. Stanis, Wheeling, both of Ill.

[73] Assignee: Medelco, Incorporated, Wood Dale, Ill.

[22] Filed: Mar. 8, 1971

[21] Appl. No.: 121,994

Related U.S. Application Data

[62] Division of Ser. No. 761,043, Sept. 20, 1968, Pat. No. 3,597,742.

[52] U.S. Cl. .......... 340/172.5

[51] Int. Cl. .......... G06f 3/06

[58] Field of Search .......... 340/172.5

[56] References Cited

UNITED STATES PATENTS

| | | | |
|---|---|---|---|
| 3,351,917 | 11/1967 | Shimabukuro | 340/172.5 |
| 3,107,344 | 10/1963 | Baker | 340/172.5 X |
| 3,095,553 | 6/1963 | Hill | 340/172.5 |
| 3,478,325 | 11/1969 | Oeters | 340/172.5 |
| 3,512,139 | 5/1970 | Reynolds | 340/172.5 |
| 3,587,059 | 6/1971 | Kennedy | 340/172.5 |
| 3,566,361 | 2/1971 | Lavertu | 340/172.5 |
| 3,273,131 | 9/1966 | Strohm | 340/172.5 |
| 3,351,914 | 11/1967 | Stone | 340/172.5 |
| 3,268,870 | 8/1966 | Chalker | 340/172.5 |
| 3,277,444 | 10/1966 | Masters | 340/172.5 |
| 3,303,472 | 2/1967 | Chalker | 340/172.5 |
| 3,312,945 | 4/1967 | Berezin | 340/172.5 |
| 3,566,365 | 2/1971 | Rawson | 340/172.5 |

*Primary Examiner*—Paul J. Henon
*Assistant Examiner*—Sydney R. Chirlin
*Attorney*—Mason, Kolehmainen, Rathburn & Wyss

[57] ABSTRACT

A hospital data handling system transmits and receives all message information normally required in hospital operations. The system input is derived from permanent punch cards containing all message and control information and disposable punch cards containing variable data, such as patient identifying cards made, for instance, when a patient is admitted. A card reader located at each message originating location or station in the hospital provides messages which are placed in a delay line input storage time divided into slots so that a single delay line is shared by a group of card readers. The data in the delay line is erased as it is transferred out to system recorders and a central processor. The time slots in the delay line are permanently assigned to different card readers to permit continuous random access to the delay line. A control circuit automatically adds synchronizing signals when lacking from the input record and stores source identifying data, such as nurse identification, at a particular location in storage in conjunction with each message.

6 Claims, 14 Drawing Figures

Inventors:
Louis E. Philipps
Eugene A. Stanis
By: Mason, Kolehmainen, Rathburn & Wyss;
ATTORNEYS.

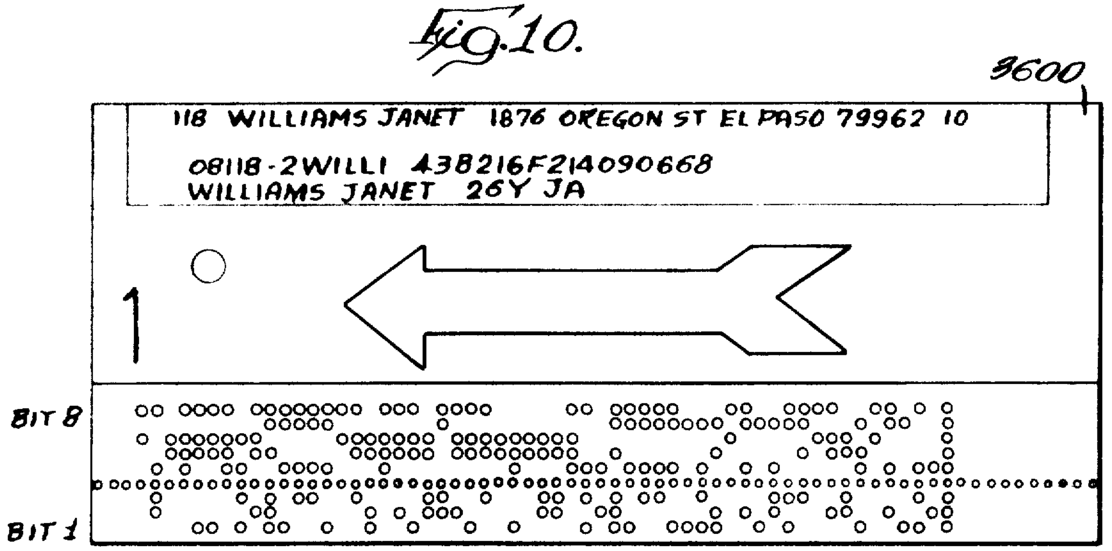
Fig. 10.
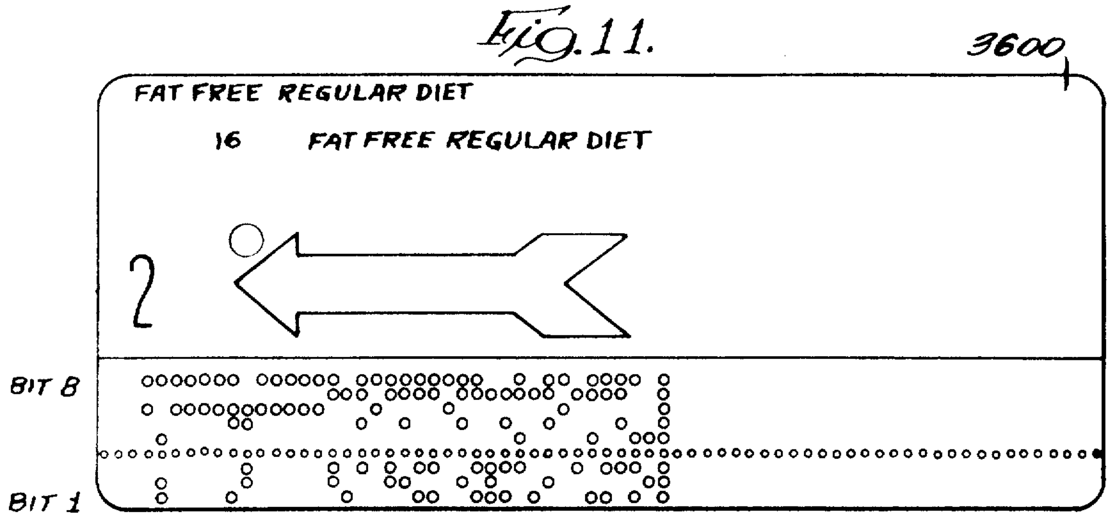
Fig. 11.
08 118-2 WILLI 438216 F 214 0906 68
WILLIAMS JANET 26Y JA
FAT FREE REGULAR DIET
054 9/ 6/68 10:45 PM
Fig. 12.

RECORD READING SYSTEM

This application is a division of a copending application Ser. No. 761,043, filed Sept. 20, 1968 now U.S. Pat. No. 3,597,742. The central data processor unit used with the system of this invention is disclosed in a copending application Ser. No. 761,042, filed Sept. 20, 1968, which application is assigned to the same assignee as the present application.

This invention relates to a data handling and processing system and, more particularly, to a system for automatically collecting data, such as data relating to hospital operations, from record controlled sources.

The operation of a hospital with even a small number of beds involves the preparation and transmission of a very large number of rather short messages relating to virtually every phase of hospital operation ranging from pharmacy orders, requests for laboratory tests, and admitting or discharging instructions to requests for repair of a broken window. In some hospitals, a written order is made only when the nature of the service demands it, and other functions such as maintenance or bed status are requested by oral communication. Further, many of the operations or items covered by the messages require a charge to be made frequently against several entities, e.g., inventory and a patient. These charges are collected either by using the primary written message or by making secondary records frequently in machine code based on a primary message.

However, the use of written orders and messages is time consuming, requires manual transmission or conveyance to perhaps a number of points of use, and is subject to error in preparation when read and translated to secondary records. The compilation and calculation of charges or inventory records requires the physical presence of all of the records, and it has been determined that errors arise not only from record loss but from charges entered for services requested that are not actually performed. The time involved in collecting and translating the records and messages frequently causes a delayed billing for charges not available on discharge and delays the submission of charges to other paying bodies such as insurance companies. Further, because of the time required by written messages, there is a temptation to use oral requests when the nature of the requested service or item does not demand a written record.

The data handling and processing system of the present invention does away with written messages and orders and insures the collection, calculation, and compilation of all charges on any desired periodic basis. Messages and charges are free of transmission errors and provide legible permanent copy for medical records. In addition, skilled hospital personnel are freed from time consuming clerical duties and from acting as messengers with the resultant increase in their availability for professional services.

In general, the system includes a central processing unit which receives data from and supplies data to a plurality of remote stations each located at a point from which messages or orders are normally received and to which this data is normally directed. Each remote station includes a data recorder such as a teleprinter and a data transmitter. The data transmitter comprises a card or record reader which is enabled for operation by the insertion and actuation of a key identifying the station operator such as a technician or nurse and which is adapted to send plural card messages to selected points. Each station includes prepared cards containing all of the message information normally required by the department and other cards individually identifying each patient. By inserting the cards forming a plural card message into the reader, the patient and requested service information is automatically transmitted to one or more points in the hospital as required for each service or message, and any data relating to charges or other data compilations is collected in storage in the central processing unit. During message transmission from the card or record reader, a digital signature identifying the key that enabled the card reader is automatically transmitted to identify the person responsible for originating the message.

The basic system organization includes a plurality of card readers, groups of which time-share different delay lines providing input buffers. Controls associated with the readers automatically supply synchronizing signals where needed or not supplied from the input record. The delay lines are scanned for complete messages to enable transfer of a complete message to a magnetic core storage unit. The data in core storage is then either transferred to a magnetic drum storage unit, or is transmitted to one or more of the remote stations, or both, depending upon the nature of the received information and the functions required to be performed on the data designated by control characters on each card. If the message requires nothing more than transmission to one or a group of stations, the data is transferred from the core storage unit to tracks on the drum which function as an output buffer, and then is delivered over output lines to the addressed stations. If the message relates to items such as chargeable services or reflects changes in the allocation or status of beds, the data from core storage is transferred to a bed information storage area or a charge information storage area on the drum, perhaps after processing in an arithmetic section which has access to the core storage unit.

Many other objects and advantages of the present invention will become apparent from considering the following detailed description in conjunction with the drawings in which:

FIGS. 1–3 form a block diagram of the data handling and processing system embodying the present invention;

FIGS. 4–8 disclose in logic schematic form a data input unit including a card reader and a control circuit for taking message data from the card reader and placing it in a delay line storage unit;

FIGS. 10 and 11 are illustrations of cards used to provide a data input to the system;

FIG. 12 is an illustration of a typical record produced by the system;

FIG. 13 is a block diagram illustrating the manner in which FIG. 14 is a block diagram illustrating the manner in which

Figure 1:
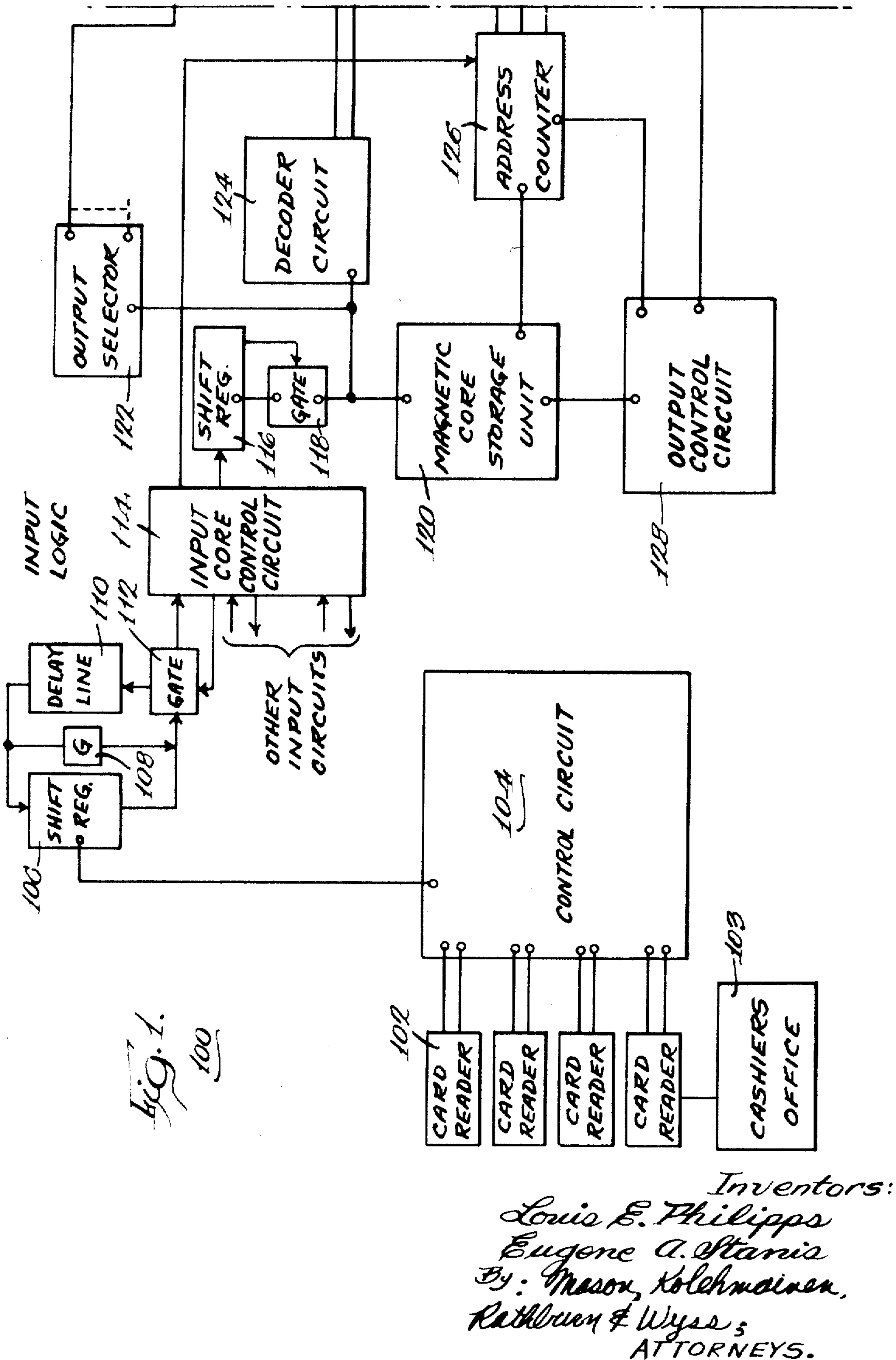
FIGS. 1–3 are placed adjacent each other to form a complete circuit diagram.
Figure 2:
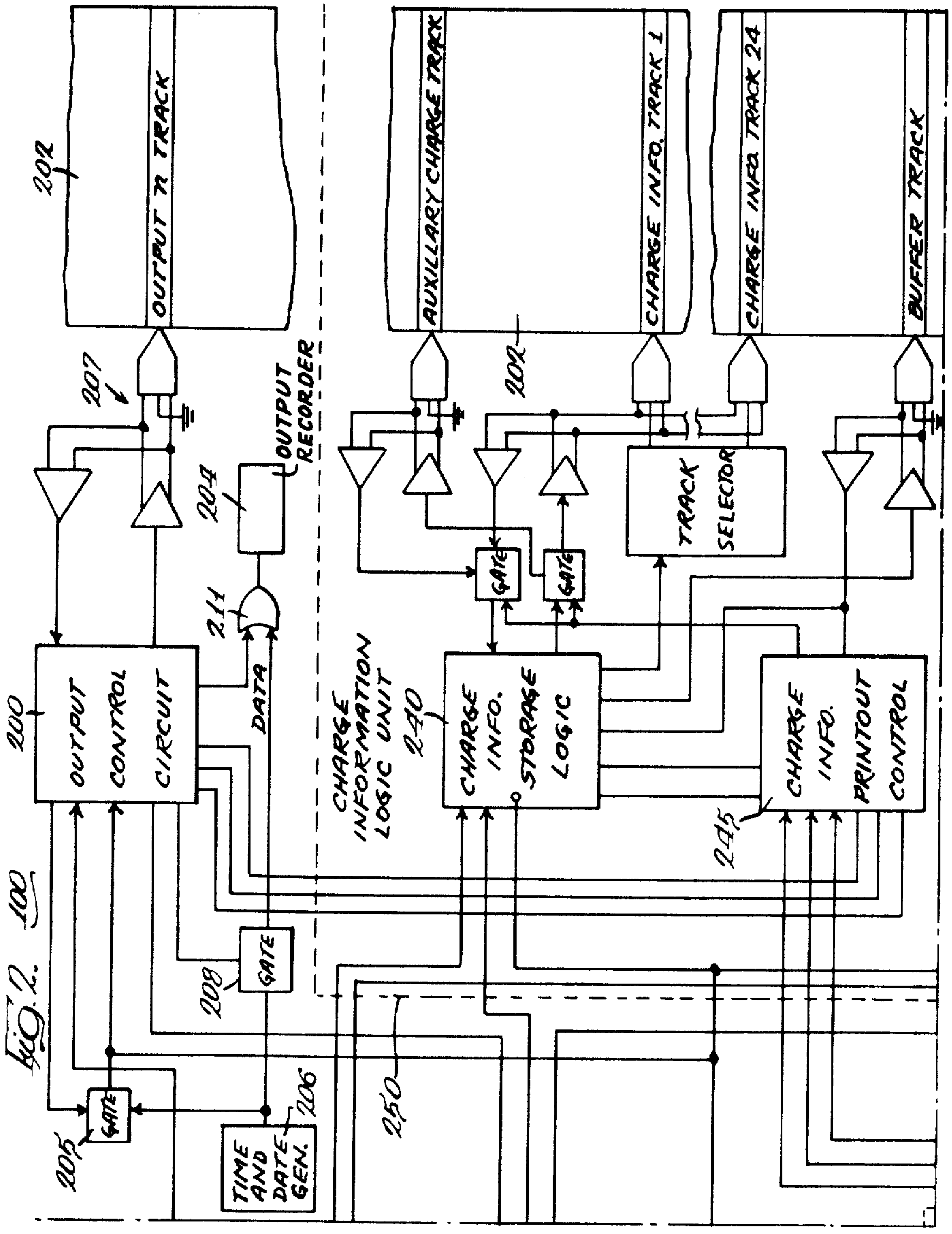
Figure 3:
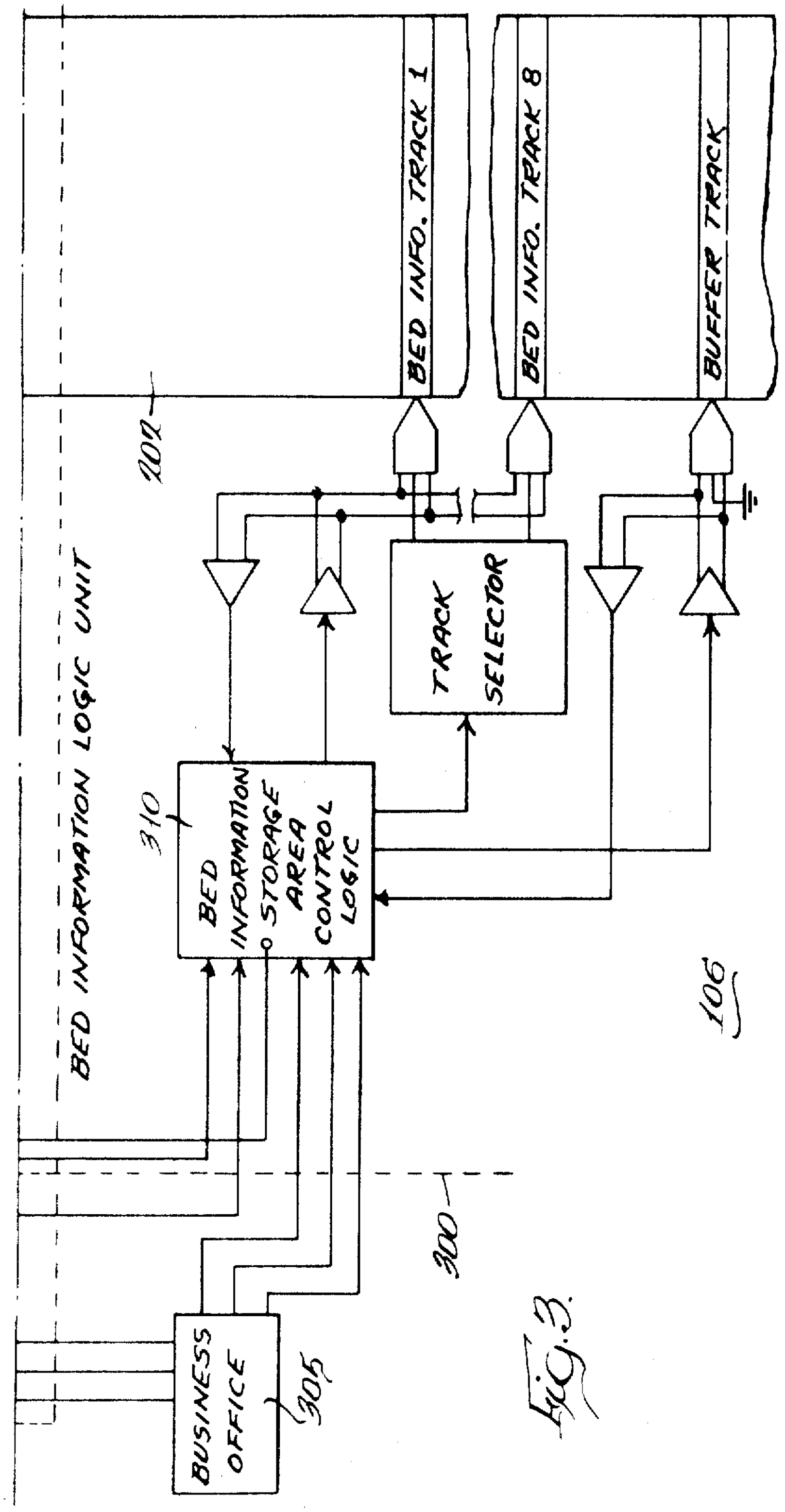

Referring now more specifically to FIGS. 1–3 of the drawings, therein is disclosed a block diagram of a system 100 embodying the present invention. The system 100 is capable of transmitting and receiving all of the communications, orders, and requests normally handled in a hospital and of automatically compiling and computing all necessary data relating to patient charges and the status of the beds in the hospital, as well as providing a running inventory control. To insure against the presence of errors, virtually all input messages are made by selecting records in machine readable code from a prepared supply thereof containing all of the messages and service requests normally required in a hospital. The patient information is derived from records prepared in machine readable code on admittance to the hospital.

Normal entry to the system is obtained through a card reader 102 which is supplied with two or more punch cards or permanent records containing patient identifying information, message information, and one or more control codes. Each of the card readers 102 is enabled by the actuation of a key individual to the operator or the person responsible for transmitting the message into the system 100. The actuation of this key appends a plural digit identifying designation to the message transmitted from each reader. A group of card readers 102 share a common delay line 110 which provides a buffer storage unit to which access is obtained through a control circuit 104. The delay line 110 is divided into a number of time slots equal to the number of card readers 102 having access to the delay line. When message data is to be loaded into the delay line 110, the control circuit 104 selects one of the card readers 102 to which it has access and transfers the information character by character into the delay line 110.

Message data stored in the delay line 110 is normally circulated through the shift register 106 and a gate 112. However, when new message information is to be added to the delay line 110, a gate 108 is enabled to bypass the shift register 106. This time shifts the message information a single character position and permits the new message material in the shift register 106 to be added to the delay line 110.

After a complete message has been stored in one of the time slots in the delay line 110, the gate 112 is selectively enabled under the control of an input core control circuit 114 which is common to a number of delay lines 110 to transfer a complete message character by character to an input shift register 116. When a complete character has been transferred from the delay line 110 to the shift register 116, it is transferred through a gate 118 to the input of a magnetic core storage unit 120. The control circuit 114 controls an address counter 126 to place each character from the shift register 116 in a predetermined address location in the storage unit 120.

As each message is shifted through the register 116 into the magnetic core storage unit 120, an output selector 122 examines the incoming message for address codes and performs one or a plurality of output selection operations to select one or a group of output controls 200 each individual to a single output such as a recorder or teleprinter 204. Each of the output control circuits 200 has access to a plurality of buffer storage blocks on a track of a magnetic drum 202 forming a part of a central processor unit consisting essentially of a charge information logic unit 250 and a bed information logic unit 300. If at least one of the buffer storage areas on the drum 202 of an addressed output control circuit is available, the output recorder 204 is considered idle or not as busy, and the magnetic core storage unit 120 is permitted to receive the entire message, and this message is erased from the delay line 110. Alternatively, if any one of the output control circuits 200 selected by the output selector 122 does not have available buffer storage space, the message is not stored in the unit 120 because it cannot be immediately processed, and the message is retained in the delay line 110 without erasure.

The system 100 also includes a decoder circuit 124 which also monitors the data supplied by the shift register 116 to the magnetic core storage unit 120 in selected locations to detect and decode certain control codes that advise the system 100 of the nature of the operation to be performed on the incoming message information. The decoder circuit 124 supplies the decoded information to the charge information logic unit 250 and the bed information logic unit 300 to indicate the disposition to be made of the message information.

If the message indicates that no operations on the data are to be performed, and it is to be supplied to an output recorder 204, an output control circuit 128 controls the address counter 126 to select the desired information and transfers this information through the circuit 128 to the output control circuit 200 with the timing required to write this information onto the buffer track of the drum 202 through conventional drum reading and writing electronics indicated generally as 207. The control circuit 200 selects an idle buffer block on the track for receiving the message information. Incident to this transfer, the output control circuit 200 enables a gate 205 so that date and time information from a date and time generator 206 can be added to the message. Further, by controlling the addresses primed into the counter 126, the output control circuit 200 can control the makeup and content of the message placed in storage on the drum. When a complete message has been stored on the drum 202, the output control circuit 200 reads the data character by character from the buffer storage block with drum timing and supplies this data through an output gate 211 with the timing required by the recorder 204 to control the recorder to produce an output message.

If the message stored in the core storage unit 120 requires processing by the central processor, this information is supplied through a charge information storage logic circuit 240 for storage on the tracks of the drum 202 assigned to the unit 250 or through a bed information storage logic circuit 310 for storage on the tracks of the drum 202 assigned to the unit 300. The patient charge and bed information is processed in the units 250 and 300 and transferred by a charge information printout control circuit 245 to the output control circuit 200 which is directly addressed by the circuit 245. This data does not go into buffer storage associated with the various control circuits 200, but is directly transferred to the output recorder. If desirable or necessary, the selected output control circuits 200 can enable the gate 208 to add date and time information to the message supplied from the units 250 and 300 under the control of the control circuits 245.

A cashier's office 103 and a business office 305 are equipped with special inputs to the system 100 that may or may not be associated with a card reader 102. The business office 305 can initiate requests for totals of charges and control the erasure of information from the drum 202. The business office 305 can also initiate a search for the room location of a patient by admission date, or by code number, and inventory searches for all items received and distributed by a particular department.

The details of the system 100 are represented by logic diagrams rather than by circuit diagrams. In physically constructing the system 100, each logic element shown is replaced by an equivalent electrical circuit that performs the logical task defined by the logic element. The use of logic elements emphasizes that any of the many differing electrical circuits capable of performing a logical task may be used in constructing the present invention.

To facilitate locating the various elements used in the system, the hundreds or thousands and hundreds digit of each reference number assigned to each element designates the Figure of the drawing on which the element is located or was first identified. As an example, a NAND gate 602 appears on FIG. 6. As an additional example, a delay line identified as 110 in the block diagram of FIG. 1 is similarly identified in the detailed logic diagram appearing in FIG. 8.

Figure 8:
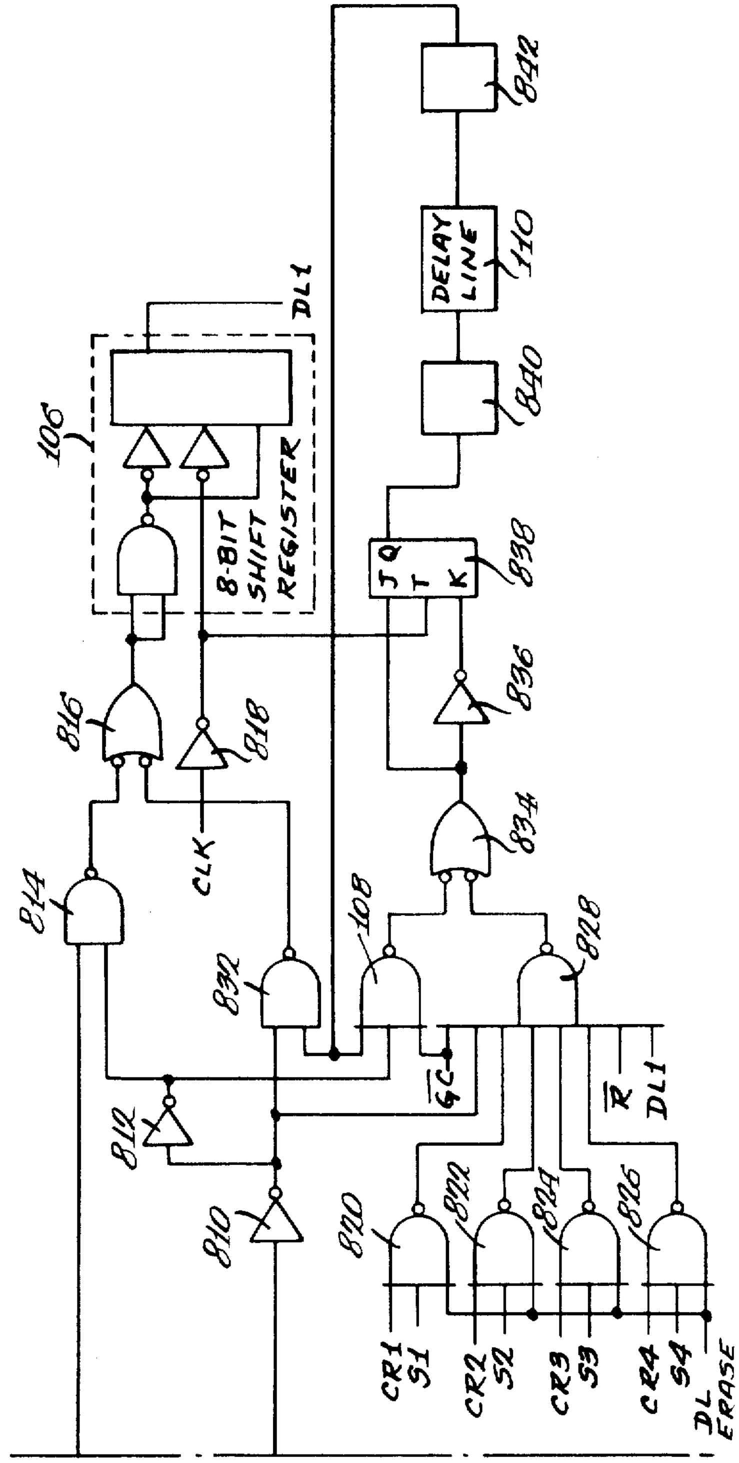
Figure 13:
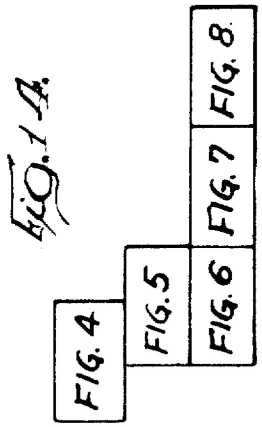
Figure 13:
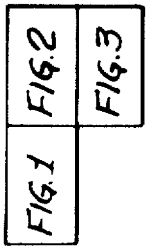

In the system 100, a high level or more positive potential normally represents a "1," "TRUE," or "PRESENT" signal, and a low level or more negative potential normally represents a "0," "FALSE," or "ABSENT" signal. Throughout this specification, the names of signals are written entirely in capitals. As an example an error reset signal generated in FIG. 8 is designated as "ERR RST." Signals are often encountered in an inverted form. This is indicated in the drawings by an overline or bar drawn over the signal name. In the specification, this inversion is indicated by placing the word "inverted" before the name of the signal. In this case of an inverted signal, a low level potential represents a "1," "TRUE," or "PRESENT" signal, and a high level potential represents a "0," "FALSE", or "ABSENT" signal.

The preferred embodiment of the system 100 is constructed almost entirely from transistor-transistor integrated circuit logic elements manufactured by Texas Instruments Incorporated, of Houston, Tex. The fundamental element in the transistor-transistor logic system is the NAND gate, such as a NAND gate 602 shown in FIG. 6. The NAND gate 602 has two inputs into and a single output from the D-shaped figure which is used as the standard logic symbol for a NAND gate in this description. The circle separating the D-shaped figure from the output lead signifies an inversion of the output signal. The output lead from this unit is high or at a more positive potential at all times except when all of the inputs are at a high or more positive potential at which time the output drops to a more negative or low potential.

Inverters (NOT gates) are represented by a triangular amplifier symbol with a circle at the input or output lead to indicate inversion. These are conveniently formed from NAND gates having their inputs wired together in parallel. An example of an inverter is an inverter 604 in FIG. 6.

Figure 7:
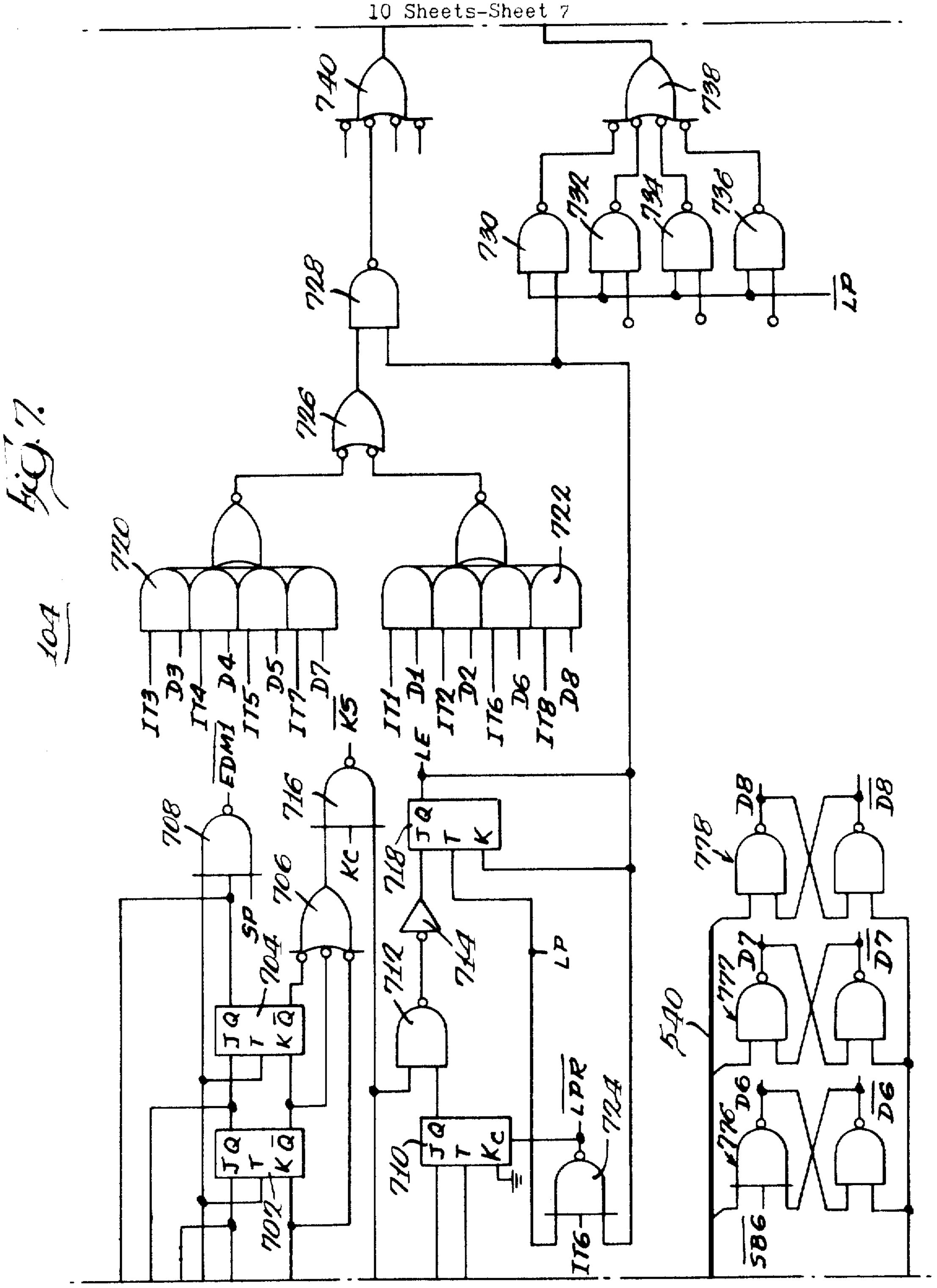

A typical AND-NOR device 720 is shown in FIG. 7. This device includes a series of two input AND gates, the outputs of which are fed into a nor gate. The output of this device is normally high or positive. It goes to a low level whenever both of the inputs to any one of the AND gates are at a high level.

Figure 6:
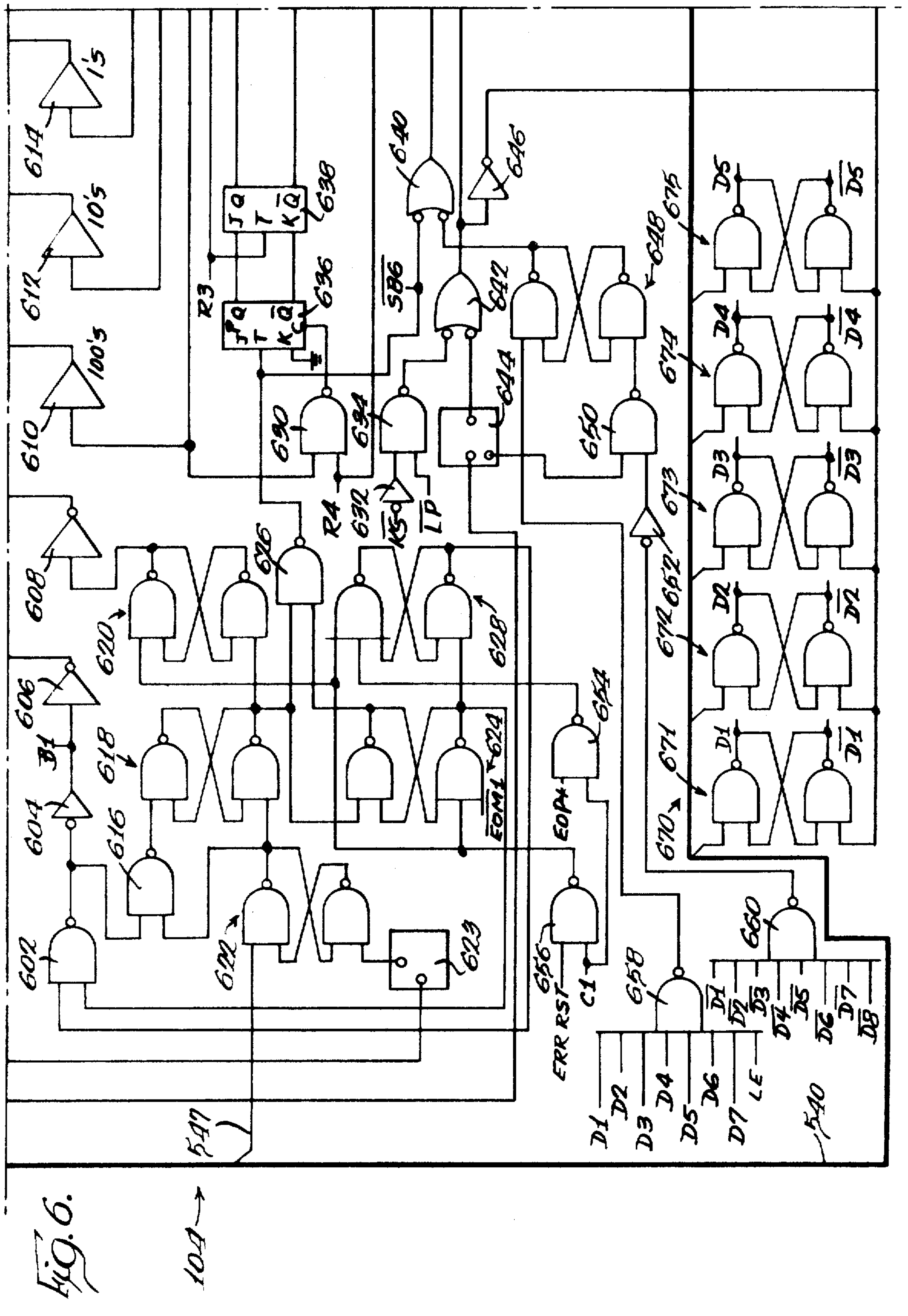

A typical NOR gate 640 is shown in FIG. 6. The output of the NOR gate 640 is low or negative if and only if both of the input leads are at a high or more positive potential. If either of the input leads is at a low level, the output rises to a high level potential.

Two general types of flip-flops are used in the system 100. The first type is constructed by cross-connecting the outputs of two NAND gates with one input of each of the gates. A typical example is a flip-flop 622 in FIG. 6 constructed from two cross-connected NAND gates.

The second general type of flip-flop is provided by a D-type flip-flop or a JK flip-flop, such as a flip-flop 636 shown in FIG. 6. The JK flip-flops can have up to seven leads or terminals, J, K, T, C, P, Q, and $\bar{Q}$. These designations appear in the rectangular block of the logic symbol only when they are used in the circuit but have all been applied to the symbol for the flip-flop 636 as an illustration.

When a clock or toggle input T of the JK flip-flop is at a high potential, data applied to the J and K input terminals is stored. When the clock lead T goes negative, this data is transferred to the Q and $\bar{Q}$ outputs and becomes the flip-flop output. When both of the J and K terminals are either open circuited or connected to a high level signal, the flip-flop toggles or reverses the state of the Q and $\bar{Q}$ terminals whenever the clock input T goes from positive to negative. If both of the J and K terminals are connected to a low level potential, the flip-flop remains in its prior state when the T input goes negative and does not toggle. When a prime or clear terminal is included in a flip-flop, the flip-flop may be set directly to a desired state. A flip-flop is cleared by applying a low level signal to the C terminal to cause a more positive potential to appear at the $\bar{Q}$ output and a low level signal to appear at the Q output. A flip-flop is set or primed by applying a low level signal to the P terminal to cause a high level signal to appear at the Q terminal and a low level signal to appear at the $\bar{Q}$ terminal.

The internal circuitry of the individual logic elements is not relevant to the present invention and is therefore not disclosed in the present application. Chapter 11 of the book *Integrated Circuit Engineering-Basic Technology*, Fourth Edition, by the staff of Integrated Circuit Engineering Corporation, Glen R. Mudland et al., published in 1966 by Boston Technical Publisher Incorporated, Cambridge, Mass., gives a rather complete explanation of digital integrated circuits suitable for use in the system 100.

Figure 9:
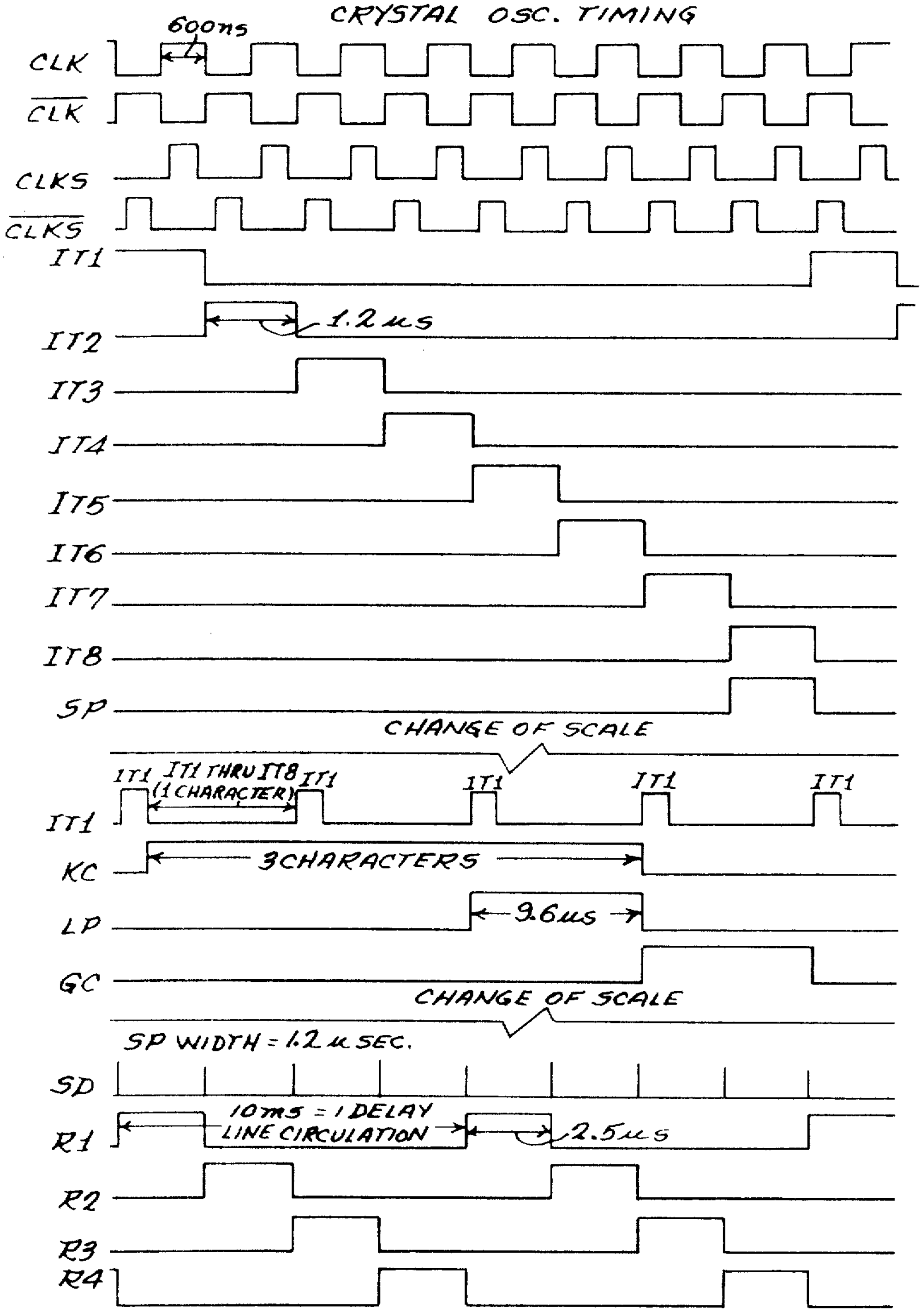
FIG. 9 is a timing diagram of certain control and clock signals used in the system.

The system 100 uses a set of synchronized timing signals to control the input of data from the card readers 102 to the delay lines 110 (FIG. 9). These signals are developed by standard components and circuits, and the circuitry for obtaining these signals is not illustrated or described. The input timing signals shown in FIG. 9 are related to the circulation time of the delay line 110 and are, for example, easily developed using a crystal controlled oscillator driving a group of frequency dividing counters. The delay lines have a circulation time on the order of 10 ms. which is time divided into four separate segments or sectors of 2.5 ms. shown as R1, R2, R3, and R4. Each of these sectors or segments in the delay line is assigned to a single card reader to receive and store a message of no more than 246 characters each comprising eight bits.

To provide character bit timing, the clock circuit develops a series of character bit timing pulses or signals IT1 - IT8 each having a duration on the order of 1.2 us. An additional control pulse SP is generated concurrent with the eighth bit timing pulse IT8. Each slot or segment defined by the signals R1 – R4 includes at its beginning a guard character signal GC of a 9.6 us. duration corresponding to one character interval. Each segment is also terminated by a KC signal of three characters duration appearing in the 244th, 245th, and 246th character positions and a load pulse or LP signal of one character duration occurring at the very end of the slot or segment in the 246th character position.

The bit timing signals IT1 – IT8 are developed from a clock signal CLK developed in the clocking circuit. These circuits also supply a secondary signal CLKS of the same periodicity as the clock signal CLK but of a duration shorter than the 600 ns. duration of the positive-going half of the clock signal CLK. An inverted secondary clock signal CLKS symmetric with the inverted clock signal CLK is also provided.

Two typical cards 3600 which can be applied to the card reader 102 to provide an input message to the system 100 are shown in FIGS. 10 and 11 of the drawings, and a typical or representative message provided at an output printer 204 from the two cards 3600 shown in FIGS. 10 and 11 is illustrated in FIG. 12. The insertion of the two cards 3600 into the card reader at nursing station "08" causes the message shown in FIG. 12 to be printed at the output printers at the originating nursing station which is assumed to be designated "08" and in the diet kitchen which is assumed to be designated as output "16".

In general, a message from a card reader can include two, three, or four cards containing no more than a total of 243 characters to which are added three characters from the key inserted in the card reader to identify the operator. Each of the cards in the message contains as a first significant character, a control character designating the type of operation or function to which the card or the message on the card relates.

To illustrate the operation of the system 100, it is assumed that the diet kitchen at output station 16 is to be advised that Janet Williams, a patient in room 118, bed 2, located at nursing station "08" is to be provided with a fatfree regular diet. Since this involves only the transmission of information and does not affect charges or bed status, only two cards are necessary. FIG. 10 of the drawings illustrates a first card relating to the patient Janet Williams which is prepared on admission and is stored at nursing station "08." The top printed line of the card includes the patient's room number "118" followed by the patient's name, address, and miscellaneous information. This printed information facilitates the selection of the card for use in the reader. The second and third printed lines are a printed record of significant or selected portions of the information stored in coded form along the lower edge of the card.

More specifically, the second printed line includes the digits "08" identifying the nursing station involved, and the following digits "118-2" designate the patient occupies bed 2 in room 118. The following information "WILLI 438216" is the patient identification insofar as the data processing system is concerned. The next character "F" indicates that the patient is female. The next three characters "214" form a numerical designation of the attending physician. The remaining digits "090668" specify the month, day, and year of some reference date such as the date of admission.

With respect to the third printed line, this i formation is contained in the message portion of the card and comprises the full name of the patient and any additional information expressed in code such as the religious preference of the patient.

Referring now more specifically to the coded portion of the record shown in FIG. 10 contained along the lower edge thereof, these records are coded in ASCII code in which the lower line of perforations represents bit position 1 and the upper line of perforations represents bit position 8. Each card must begin with a space code consisting of perforations in the sixth and eighth bit levels, and the second character on each card is a control character. Since the card shown in FIG. 10 is designated as a control N card, perforations representing mark conditions are present in the second, third, and fourth bit positions. The eighth bit position is used to provide even parity, and thus a perforation is provided in the eighth bit position for the control N character. The next 29 characters comprise the information contained in the second printed line on the card including a space code between the "I" in "WILLI" and the "4" in the remainder of the line. Following these characters, a carriage return code and a line feed code are provided. The remaining characters are a coded representation of the third line of the printed message including the indicated spaces, and the message terminates with a carriage return, a line feed, and a code delete or "RUB OUT" code comprising perforations in all eight bit positions.

The second card of the illustrative message is designated a control K card which is illustrated in FIG. 11 The top printed line is provided to facilitate selection of the card containing the desired message, and a second printed line contains the station to which the message is to be directed together with the complete text of the message. In the coded portions appearing along the lower edge of the card, the first character comprises the required space code, and the second character comprises the required control character, in this case a control K. The next ten characters are provided to select up to five two digit stations. Since only one station is to be selected, space codes fill this area of the card except for the two characters providing a coded representation of the diet kitchen designation "16". The remainder of the card consists of the printed message shown in the second line of the card, and the card is terminated with a carriage return code, a line feed code, and a delete code.

The message produced by feeding the cards shown in FIGS. 10 and 11 into the system 100 is shown in FIG. 12. This message is produced at both the nursing station "08" at which the message originated and at the diet kitchen station "16". The first line of the printed message includes the second printed line of information from the card shown in FIG. 10 with spaces inserted by a format generator in the system 100. The second line of the printed message shown in FIG. 12 includes the information shown in the third printed line on the card illustrated in FIG. 10. The third line of the message includes data from the second printed line on the card shown in FIG. 11 with the station designation "16" omitted.

The last line of the message shown in FIG. 12 includes the numerical designation "054" which is appended to the message transmitted at the station "08" and which was derived from the key number of the nurse or other operator placing the message. The remaining portion of the fourth line of the message is generated by the date and time generator 206 in the system 100.

Figure 4:
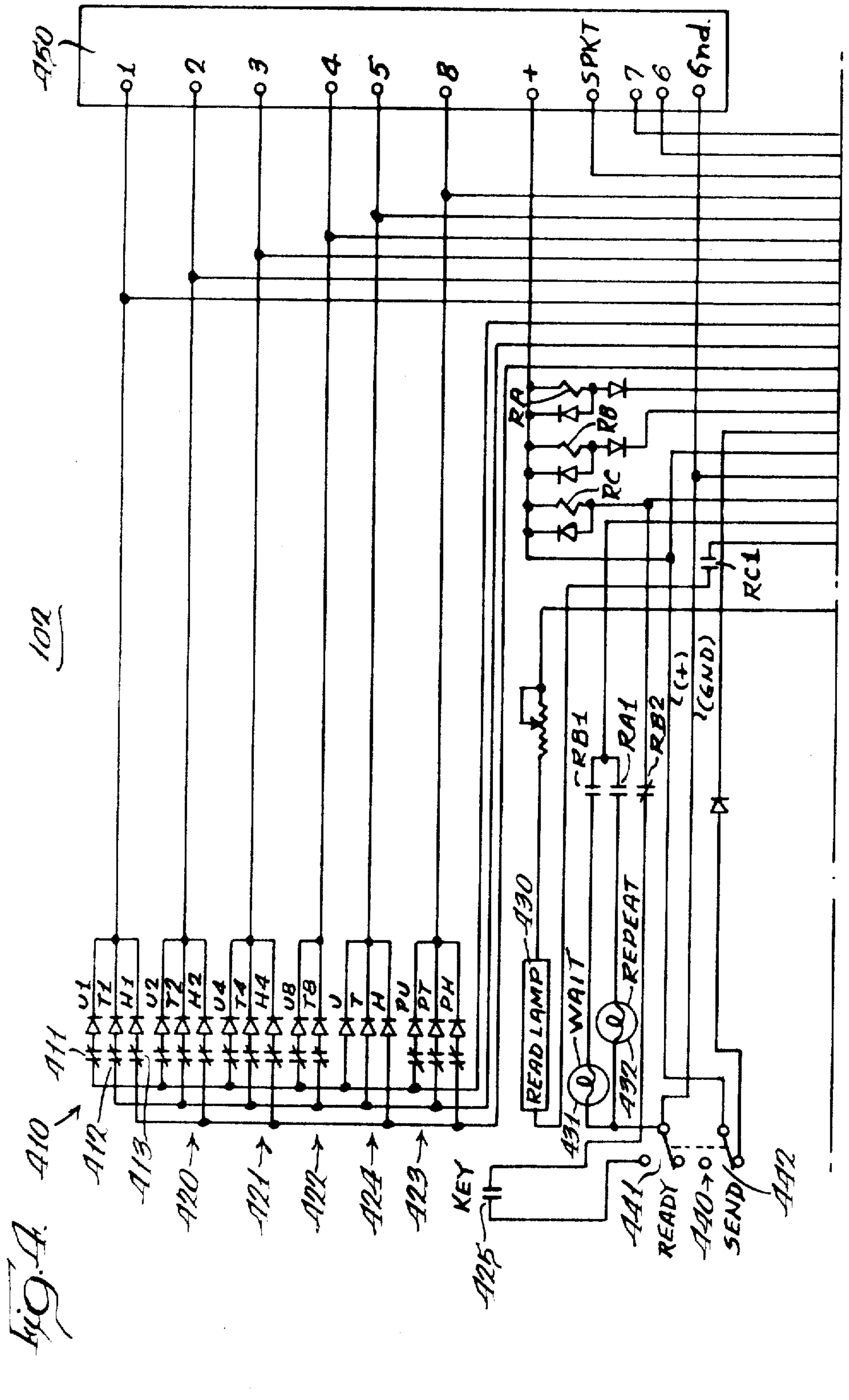
FIGS. 4–8 are placed adjacent each other to form a complete circuit diagram.
Figure 5:
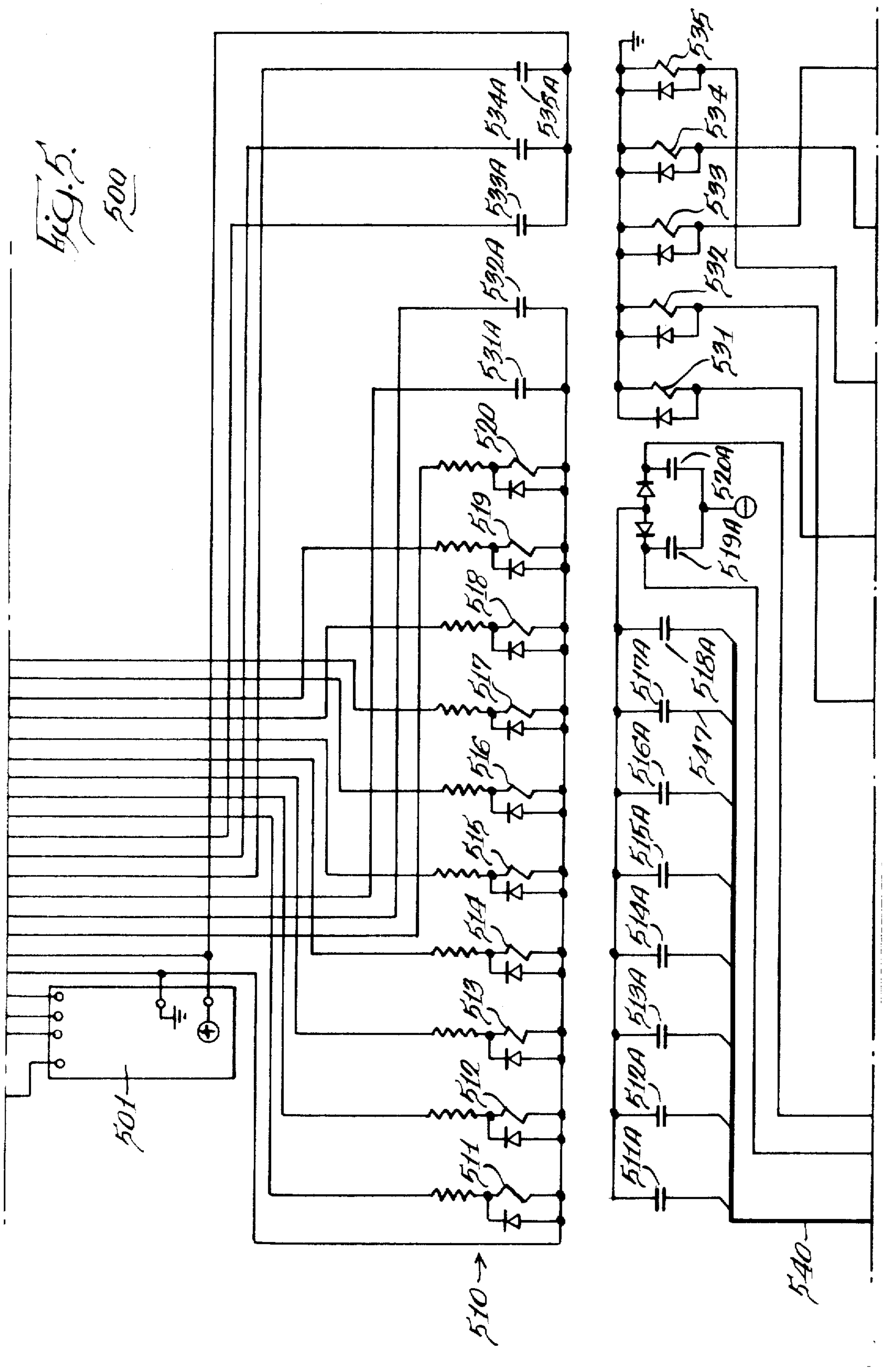

Assuming that the message including the two cards shown in FIGS. 10 and 11 is to be transmitted through the system 100, these two cards are placed in the card reader 102 (FIG. 4) at nursing station "08", and the nurse who is assumed to be identified by the designation "054" inserts her key into the card reader 102. This key can either comprise a perforated record or badge or can comprise a key of more or less conventional appearance, the coded profile of which selectively represents the assigned digital designation. When the key is inserted into the reader 102, a pair of normally open contacts 425 are closed, and four groups of normally closed contacts 410 and 420–423 are selectively actuated to provide a coded representation of the designation "054".

More specifically, the contact group 410 includes three normally closed contacts 411–413 representing the binary weight "1" in the units, tens, and hundreds denomination. With the assumed nurse designation, the contacts 411 and 413 would be opened indicating an absence of a "1" bit in the units and hundreds denominations, and the contacts 412 would remain closed representing the presence of a binary weight "1" in the tens denomination. The contact groups 420–422 are similarly actuated in accordance with a coded representation of the operator's identifying number. The contacts in the group 423 are selectively actuated to provide even parity. A group 424 of three diodes selectively provides the fifth bit required of all number codes in the ASCII code.

To initiate the card reading operation, the operator actuates a switch 440 to close a pair of normally open contacts 441 and to open a pair of normally closed contacts 442. The opening of the contacts 442 interrupts the operating circuit for a normally operated relay 520 in a group 510 of input relays 511–520 in an interface circuit 500 to supply control data from the card reader 102 to the input control circuit 104. The release of the relay 520 opens a pair of normally closed contacts 520A to remove a negative potential which is supplied through a pulse shaping circuit 623 to one input of a flip-flop 622. The status of the flip-flop 622 in the control circuit 104 is not changed at this time, but this flip-flop is freed for subsequent control.

The closure of the contacts 441 forwards ground potential from a card reader control circuit 501 through the normally closed contacts 425 and a pair of normally closed contacts RB2 to complete an operating circuit for a relay RC. The operation of the relay RC closes a pair of normally open contacts RC1 to connect a read lamp 420 in the card reader 102 to a source of potential in the control circuit 501. This provides a source of illumination for photoelectrically reading the perforated card 3600. The ground signal forwarded through the closed contacts 425 is also forwarded to the control circuit 501 to energize a drive motor for advancing the perforated cards through the card reader 102 during which they are photoelectrically sensed.

More specifically, as the cards move through the card reader 102, each successive transversely extending line of perforations is photoelectrically scanned in a conventional photoelectric scanner unit 450 to provide a more positive potential at each of the numbered terminals on the unit 450 corresponding to a bit position at which a perforation or mark signal is present. As an example, the space code which is the first item sensed on the control N card includes perforations in the sixth and eighth bit positions, and positive signals are applied to the sixth and eighth terminals by the reader 450. This reader also senses the line of sprocket holes in the card shown in FIGS. 10 and 11 intermediate the third and fourth bit positions and thus supplies a positive gating signal at a sprocket terminal SPKT for each character read.

The positive signals provided at the output of the photoelectric sensing unit 450 are selectively applied to the operating windings of the bit output relays 511—518 and the winding of the sprocket relay 519. These relays close corresponding contacts 511A—519A. The contacts 511A—518A are connected over a cable 540 to the corresponding set terminals of eight flip-flops or bistables 671—675 and 776—778 forming an input register 670. Since the first code read by the card reader 102 is a space code, the contacts 516A and 518A are closed to apply a more negative or low level potential to the set terminals of the flip-flops 776 and 778.

When the contacts 519A are closed representing the presence of a sprocket pulse, a more negative potential is applied through a pulse shaping and delay network 644 to provide a positive-going pulse at the output of a gate 642. This pulse is inverted in an inverter 646, the output of which is connected to the reset terminals of all of the flip-flops 671—675 and 776—778. This pulse resets the register 670 to a normal state, and at the trailing edge of this pulse the clamp is removed from the flip-flops in the register 670 to permit these flip-flops to be set in accordance with the input signal. Since the input signal is a space code, the flip-flops 776 and 778 are set, and the remaining flip-flops in the register 670 remain in a reset condition.

A gate 660 is provided for decoding the receipt of a space code and provides a more negative signal at its output in response to the received space code which is inverted in an inverter 652 and applied to one input of a gate 650. The circuit 644 supplies a second enabling input at this time so that the output of the gate 650 drops to a more negative potential to set a flip-flop 648 to a condition in which a more negative potential is applied to one input of the gate 640, the output of which is connected to the J input of a flip-flop 710. Thus, when the trailing negative-going edge of the pulse from the gate 642 is applied to the clock terminal of the flip-flop 710, this flip-flop is set so that a more positive potential is provided at its Q output. This enables one input to a gate 712.

If it is assumed that the card reader 102 is assigned the first time slot defined by R1 timing in the associated delay line 110, the other input to the gate 712 is enabled by the R4 signal so that during this interval the gate 712 is effective through the inverter 714 to apply a more positive potential to the J terminal of a flip-flop 718. During the last character interval of the R4 signal and at the termination thereof which effectively terminates the fourth time slot, the trailing edge of an LP signal applied to the clock terminal of the flip-flop 718 sets this flip-flop to a condition in which a more positive potential is applied to its Q terminal to develop an LE or load enable signal. This signal is returned to the K input of the flip-flop 718 as well as to one input of each of three gates 724, 728, and 730. The signal LE is used to control the bypassing of the shift register 106 to provide a one character shift in the delay line 110 during the first time slot defined by the R1 signal to permit the character stored in the register 670 to be added to the delay line 110.

More specifically, during normal operation of the delay line, the output signals supplied through an output interface 842 are returned to a gate 832 and a gate 816 to be shifted through the eight bit shift register 106 under the control of the CLK signal applied to an inverter 818. The output of the shift register 106 appears as a DL1 signal which is connected to one input of an otherwise fully enabled gate 828. Thus, the signal is returned through a gate 834 and applied in direct and inverted form to the J and K terminals of a flip-flop 838, the Q terminal of which is coupled to the input of the delay line 110 through an input interface 840. Thus, signals in the line 110 are normally circulated through the shift register 106 and clocked by the CLK signal to insure synchronization.

However, when the LE signal is applied to one input of the gate 730, the other input of this gate is enabled by the inverted LP signal and an inverter 810 applies an inhibit to the gates 832 and 828 to prevent circulation of signals through the line 110 starting at the beginning of the first time slot defined by the R1 signal. The output of the inverter 810 is, however, inverted by an inverter 812 to enable the bypass gate 108 at the conclusion of the initial guard character during which this gate is inhibited by the inverted GC signal. Thus, the signals in the delay line 110 are directly returned to the input interface 840 through the gates 108 and 834 bypassing the shift register 106. During this entire interval, the LE signal also enables one input to the gate 728, the other input of which is connected to the output of a pair of AND-NOR circuits 720 and 722 through a gate 726. The gates 720 and 722 include a plurality of AND gates, one input of which is supplied with the output from the flip-flops in the register 670 and the other of which is supplied with bit timing pulses IT1 – IT8. Thus, during this entire interval, the space character stored in the register 670 is being shifted into the shift register 106 through the fully enabled gate 814. It cannot be shifted out of the register 106 because the gate 828 to which the output of the register 106 is connected is inhibited.

However, when the LP signal in the first slot defined by R1 timing is reached, the inverted LP signal applied to the gate 730 inhibits this gate to cause the gate 108 to be inhibited and the gates 832 and 828 to be enabled. Thus, the next character coming out of the delay line 110 is returned by the gate 832 to the input of the shift register 106, and the character stored therein which is the character stored in the register 670 is shifted into the input of the delay line 110 through the gates 828 and 834. Accordingly, the character received from the reader 102 and stored in the register 670 has now been shifted into the first time slot in delay line 110 to which the reader 102 is assigned.

At the beginning of the LP interval in which the first character or space code is shifted out of the register 106 into the delay line 110, the gate 724 is fully enabled during the bit interval defined by the signal IT6 to provide a negative-going signal that clears or resets the flip-flop 710 so that a more negative potential is applied to its Q terminal to inhibit the gate 712. The negative-going trailing edge of the LP pulse clocks the flip-flop 718 to set the Q terminal at a more negative potential and thus terminate the LE signal. The control circuit 104 remains in this condition until the next character is read by the card reader 102 and stored in the register 670.

At this time the sprocket pulse is again effective through the circuit 644 and the gate 642 to clock the flip-flop 710. This in turn causes the flip-flop 718 to be set with the Q terminal high on the next LP pulse during the fourth slot defined by signal R4 so that during the following time slot defined by the signal R1 the shift register 106 is again bypassed and the second character, in the illustrative example a control N, is inserted into the delay line 110. This operation continues until the entire message on the control N card has been placed in circulating storage in the delay line 110.

Since the message on each card terminates with a code delete, the last item supplied from the first card placed in the reader 102 sets all of the flip-flops in the register 670, and this code delete character is read into the delay line 110 in the manner described above. However, during the interval defined by the signal R1 in which the code delete character is read into the delay line 110, the LE signal completes the enabling of a gate 658 so that the low potential output from this gate resets the flip-flop 648 to a condition in which a high potential is connected to the connected input of the gate 640. Thus, additional information cannot be loaded into the delay line 110 until the space flip-flop 648 is set by the initial space code on the second card in the message transmitted by the card reader 102.

When this next initial space code is supplied from the card reader 102 to the register 670, the flip-flop 648 is again set and the information stored on the second card is stored in the delay line 110 in the first time slot defined by the signal R1 in the manner described above. Thus, the characters from the two cards forming the message are now stored in the delay line 110 in the first segment or time slot therein, and the flip-flop 648 has been reset by the code delete character terminating the message on the second card. The next operation performed by the control circuit 104 is to enable the card reader 102 to transmit the hundreds, tens, and units digit of the key designation for storage in the delay line 110.

During the reading of the first and second card, the appearance of any alphabetical character causes the operation of the relay 517 to close the contacts 517A because each alphabetical character includes a seventh bit. The closure of the contacts 517A sets the flip-flop 777 in the register 670 but also supplies a more negative signal over a conductor 547 which extends through the cable 540 to an input of the flip-flop 622. Thus, the flip-flop 622 is set to apply a more positive potential to the connected input of a gate in a flip-flop 618 and also to the lower input of a gate 616. The upper input to the gate 616 is enabled at this time by the output of a gate 602, and a more negative potential is supplied by the gate 616 to set the flip-flop 618 so that this flip-flop applies a more negative potential to the upper input to a flip-flop 624 so that this flip-flop is set to apply an enabling potential to one input of a gate 626, the other input of which is inhibited by the flip-flop 618. The setting of the flip-flop 624 also sets the flip-flop 628 so that an enabling potential is applied to the upper input of the gate 602. The gate 602 remains inhibited, however, because of the inhibiting potential supplied from the output of the flip-flop 624.

The control circuit 104 remains in this condition at the conclusion of the reading of the second card message into the delay line 110. At this time the operator at the card reader 102 returns a switch 440 to the position illustrated in FIG. 4, and this actuation of the switch 440 reads the three key characters or digits into the delay line 110 and initiates the transfer of the message from the delay line 110 through the scanner or core input control 114 to the core storage unit 120. More specifically, when the switch 440 is returned to the position shown in FIG. 4, the operating circuit for the relay RC is opened so that the contacts RC1 are opened to terminate the illumination of the read lamp 430. Further, the control circuit 501 in the card reader 102 is stopped.

When the contacts 442 are closed, a positive potential is again applied to the winding of the relay 520 to operate this relay so that a more negative potential is applied to the pulse shaping circuit 624 to reset the flip-flop 622. The reset flip-flop 622 inhibits the gate 616 and resets the flip-flop 618. When the flip-flop 618 is reset, both inputs to the gate 626 are enabled, and the output of this gate drops to a more negative potential and clocks a flip-flop 636. Since the K terminal of the flip-flop 636 is tied to ground, the Q terminal of the flip-flop 636 rises to a more positive potential, and the Q terminal drops to a more negative potential, these potentials being applied to the JK terminals of a flip-flop 638. The negative potential at the output of the gate 626 is also forwarded through the gate 640 to hold the J terminal of the flip-flop 710 at a more positive potential. The output of the gate 626 is also applied as an inverted SB6 signal to one input on one of the gates in the flip-flop 776 to hold this bistable set during the card reading.

On the trailing edge of the next following R3 signal, the flip-flop 638 is clocked so that its $\overline{Q}$ output drops to a lower potential and its Q output rises to a high level. This high level signal is applied to the input of a relay driver 610 and to one input of a gate 630. The low output of the $\overline{Q}$ terminal is inverted in a gate 706 and applied as one enabling input to the gate 716.

The more positive signal applied to the input of the line driver 610 causes the operation of the relay 535 to close the contacts 535A so that ground potential is applied to the hundreds contacts in the groups 410 and 420–423 and to the hundreds diode in the diode group 424. Thus, the relays in the group 510 corresponding to the bits "1", "2", "3", "4", "5", and "8" are selectively operated in accordance with the code for the value of the hundreds digit and selectively operate the bistables in the register 670 in accordance therewith. In this connection, the ASCII code for numerals requires bits "5" and "6". The "5" bit is provided from the card reader 102 by the diode group 424, and the bit "6" is provided by the inverted SB6 signal derived from the output of the gate 626 in the control circuit 104. By selectively supplying one bit from the card reader 102 and one bit from the control circuit 104, a check is made to insure that the character stored in the register 670 is a valid character arising from reading the key in the card reader 102.

The leading edge of the R4 signal defining the fourth slot in the delay line 110 completes the enabling of the gate 630, and the output of this gate clears or resets the flip-flop 636 so that a low level signal is provided at the Q terminal and a high signal at the $\overline{Q}$ terminal. The R4 signal also partially enables the gate 712 and further enables the gate 716. At the beginning of the last three character spaces in the fourth time slot, the gate 716 is fully enabled by the KC signal to provide an inverted KS signal which is forwarded through an inverter 632 to enable one input of a gate 634. The other input of this gate is enabled by the inverted LP signal so that the gate 634 provides a more negative input to the gate 642. This performs the same function as the signal provided by the circuit 644 and is effective through the inverter 646 to reset the register 670. At the beginning of the LP signal in the fourth time slot defined by the R4 signal, the gate 634 is inhibited, and the reset signal for the register 670 provided by the inverter 646 is removed permitting the register 670 to store the hundreds digit of the key designation derived from the card reader 102. The negative-going pulse provided by the gate 642 at this time also clocks the flip-flop 710 to initiate the loading of the hundreds digit of the key designation in the delay line 110 during the next following first time slot defined by the R1 signal in the manner described above. Thus, the gates 634 and 642 provide an artificial sprocket signal to clock the key characters into the delay line 110 in the same manner that this function is performed by the sprocket signals derived from the card.

Since the input flip-flop 636 has been cleared, the trailing edge of the next following R3 signal shifts a "1" into a flip-flop 702 and clears the flip-flop 638. This disables the line driver 610, removes the enabling from the gate 630, and operates a line driver 612 to operate the relay 534 to close the contacts 534A. Thus, the tens digit of the key designation is now read in the card reader 102 and stored in the delay line 110 in the manner described above. During the next cycle, the R3 signal clears the flip-flop 702 and sets a "1" into a flip-flop 704 to disable the tens line driver 612 and to operate the units line driver 614 so that the relay 533 is operated to read the units digit of the key designation into the delay line 110.

The setting of the last flip-flop 704 also partially enables a gate 708 so that during the SP signal occurring during the next following R3 signal, i.e., after the loading of the units key digit in the delay line 110, the gate 708 is fully enabled to provide an inverted EOMI signal which is returned to one input of a gate in the flip-flop 624. The termination of the R3 pulses also shifts the "1" out of the flip-flop 704 so that the shift register counter including the flip-flops 638, 702 and 704 is cleared.

The inverted EOMI signal resets the flip-flop 624 so that an inhibiting signal is applied to one input of the gate 626 which aids in restoring the circuit 104 to a normal condition. The high level signal from the flip-flop 624 completes the enabling of the gate 602 so that its output drops to a more negative potential to inhibit one input of the gate 616. This signal is also effective through an inverter 604 to apply a more positive signal to a line driver 606 which operates the relay 532 to close the contacts 532A. The closure of the contacts 532A operates a relay RB in the card reader 102 to open the contacts RB2 and to close a pair of normally open contacts RBI. The closure of the contacts RBI illuminates the wait lamp 431 to provide a visible indication that the card reader 102 cannot be used until the message stored in the assigned first time slot of the delay line 110 has been transferred to the core storage unit 120. The opening of the contacts RB2 prevents the initiation of a card reading operation in the event that the switch 440 is operated to again close the contacts 441.

The B1 signal provided at the output of the inverter 604 also advises the core load control circuit 114 that a complete message has been stored in the sector of the delay line 110 assigned to the card reader 102 which should be transferred to the core storage unit 120.

If the storage of data proceeds satisfactorily, the control circuit 104 is supplied with a signal indicating the satisfactory transfer, and this circuit as well as the connected card reader 102 are restored to a normal condition. More specifically, at this time a high level C1 signal is supplied from the control circuit 114, and a high level signal EOP* is supplied, both as described in the parent application, to fully enable a gate 654. The low level output from the gate 654 resets the flip-flop 628 so that an inhibiting potential is applied to the upper input of the gate 602. This removes the signal B1 and releases the driver 606 so that the relays 532 and RB are released to restore the card reader 102 and the control circuit 104 to a normal condition.

In the event that an error is encountered during the transfer of data from the delay line 110 to the core storage unit 120, the lower input to a gate 656 is enabled by the C1 signal, and an error reset signal ERR RST is supplied, as described in the parent application, to fully enable the gate 656. The more negative output from the gate 656 resets the flip-flops 624 and 628 and sets a flip-flop 620. The resetting of the flip-flops 624 and 628 produces the functions described above including the termination of the illumination of the wait lamp 431. The setting of the flip-flop 620 enables a relay driver 608 so that the relay 531 is operated to close the contacts 531A. The closure of the contacts 531A operates a relay RA to close a pair of contacts RA1. The closure of the contacts RA1 illuminates the repeat lamp 432 to provide a visible indication that the message previously transmitted by the card reader 102 must be retransmitted because of an error. The flip-flop 620 is reset when the flip-flop 618 is next set by the gate 616 by the receipt of a bit "7" from the card reader 102 indicating the transmission of alphabetical information.

As indicated above, the delay line 110 is shared by a group of four card readers. The control circuit 104 includes three additional circuits similar to those shown on FIG. 6 and the left-hand portion of FIG. 7, the outputs of which are supplied to the terminals of the gates 732, 734, and 736 and the terminals of the NOR gate 740 so that all four card readers have access to the delay line 110.

Data is transferred from the delay line or circulating storage means 110 to the core storage unit 120 and is erased or cleared from the delay line 110 using four gates 820, 822, 824, and 826 as described in detail in the above-identified parent application.

Although the present invention has been described with reference to a single illustrative embodiment thereof, numerous other modifications and embodiments can be devised by those skilled in the art that will fall within the spirit and scope of the principles of this invention.

What is claimed and desired to be secured by Letters Patent of the United States is:

1. In a data handling system using a first data bearing record having synchronizing data and a second data bearing record without synchronizing data, data utilization means, a data register for supplying data stored in the register to the data utilization means, a record reader supplied with the first and second records and coupled to the register to store the data from the first and second records in the register, said record reader also supplying control signals under the control of the synchronizing data on the first record, an enabling circuit supplied with said control signals and operative to enable the transfer of data from the data register to the utilization means, a control means for controlling the transmission of data from the second record to the data register, and a signal generator coupled to the enabling circuit and controlled by the control means to provide signals to the enabling circuit in place of said control signals when data from the second record is being supplied to the data register.

2. The data handling system set forth in claim 1 including a counting means coupled to the signal generator and operable to control the number of signals supplied to the enabling circuit by the signal generator.

3. The data handling system set forth in claim 1 in which the control means includes counting means coupled to the record reader for controlling the reading of the second record by the record reader.

4. A data handling system for use with plural character records comprising a plurality N of record reading means, a circulating storage means with a given data recirculating period divided into N different time slots, each capable of storing a plurality of characters, said storage means including an input and an output, a shift register with a shift register input and a shift register output, first and second gate means, means connecting the first gate means between the output and the input of the circulating storage means, means connecting the second gate means between the output of the circulating storage means and the shift register input, gate control means having a first setting normally inhibiting the first gate means and enabling the second gate means and operable to a second setting to inhibit the second gate means and enable the first gate means, a plurality N of input circuits each coupled between one of the record reading means and the shift register input and controlled by the record reading means to supply character data derived from the records to the shift register, said input circuit including means controlled by said gate control means when said gate control means is in its second setting for supplying characters to be stored in the storage means to the shift register, and control circuit means connected to the N input circuits for permanently assigning a different time slot to each one of the record reading means and for enabling all of the record reading means to enter data into the circulating storage means during a single recirculating period.

5. The data handling system set forth in claim 4 wherein the record includes synchronizing data, and the record reading means is controlled by the synchronizing data to operate the gate control means from its first setting to its second setting.

6. A data handling system for use with data records providing a variable number of characters followed by source identifying data comprising record reading means for reading the records and providing both character signals and identifying signals, a storage means coupled to the record reading means and supplied with the character signals and the identifying signals, said storage means including a recirculating storage means having a number of sequential storage locations defined by time slots and large enough in number to store the number of characters on the records and the source identifying data, and control means coupled to the storage means and the record reading means and responsive to the character signals and the identifying signals for storing the character signals in a variable number of time slots in the storage means determined by the number of characters and for then storing the source identifying data in subsequent time slots spaced from the time slots containing the characters by a number of time slots varying in number in dependence on the number of stored characters.

* * * * *